United States Patent [19]

Yamazaki et al.

[11] 3,982,252

[45] Sept. 21, 1976

[54] LIGHT EXPOSURE APPARATUS FOR MANUFACTURING COLOR PICTURE TUBES

[75] Inventors: Eiichi Yamazaki, Ichihara; Koichi Maruyama, Mobara; Toshio Ueda, Mobara; Hiroshi Yokomizo, Mobara; Iwao Ogura, Tokyo, all of Japan

[73] Assignee: Hitachi, Ltd., Tokyo, Japan

[22] Filed: Aug. 22, 1974

[21] Appl. No.: 499,563

[30] Foreign Application Priority Data

Aug. 29, 1973 Japan .................................. 48-96096

Aug. 29, 1973 Japan .................................. 48-96097

[52] U.S. Cl. ........................................................ 354/1

[51] Int. Cl.$^2$ ............................................ G03B 41/00

[58] Field of Search .......................................... 354/1

[56] References Cited

UNITED STATES PATENTS 3,667,355 6/1972 Ng et al. .................................. 354/1

*Primary Examiner*—Joseph F. Peters, Jr.

*Assistant Examiner*—James LaBarre

*Attorney, Agent, or Firm*—Charles E. Pfund

[57] ABSTRACT

In light exposure apparatus wherein the face plate of a color picture tube is exposed to the light from a light source through a swinging illumination intensity correcting filter, a correction lens and a color selection electrode, the effective surface of the illumination intensity correcting filter comprises a plurality of regions having different light transmitting ability, and the effect of the optical characteristics at the interfaces between the regions is arranged and substantially eliminated by the swinging motion of the illumination intensity correcting filter.

9 Claims, 6 Drawing Figures

LIGHT EXPOSURE APPARATUS FOR MANUFACTURING COLOR PICTURE TUBES

BACKGROUND OF THE INVENTION

This invention relates to light exposure apparatus, and more particularly to light exposure apparatus for forming a fluorescent screen of a colour picture tube.

The colour picture tube is usually constructed such that a fluorescent screen which is formed on the inner surface of the panel of the tube by arranging a plurality of phosphors of red, blue and green colours in the form of dots or stripes is selectively excited through a colour selection electrode by means of electron beams emanated from an electron gun assembly, whereby to reproduce picture images. The fluorescent screen is usually formed as follows. For example, the light emitted from a light source is transmitted through a correction lens which is used for the purpose of correcting the apparent position of the light source to expose to the light the fluorescent screen on the inner surface of the panel after passing through a colour selection electrode (such as a shadow mask) which is disposed at a predetermined distance from the correction lens and with a predetermined relation with respect to the fluorescent screen to be exposed. As a result, the photosensitive material coated on the exposed portion of the fluorescent screen is exposed to form the fluorescent screen having a desired arrangement of dots or stripes.

The dimension of the dots, or the width of the stripes formed on the fluorescent screen in this manner is determined in accordance with the quantity of the exposure light which in turn is determined by the position of the dots or stripes on the fluorescent screen. Usually, for the purpose of obtaining a light quantity distribution necessary to subject the positions on the fluorescent screen on which the dots or stripes are to be formed to the exposure of the light having an adequate value quantity, an illumination intensity correcting filter having a proper density distribution with respect to the exposure light is disposed between the light source and the colour selection electrode.

Although the illumination intensity correcting filter having a proper illumination density distribution is generally prepared by vacuum deposition technique or photographic process it is rather difficult to obtain the desired density distribution.

Especially, it is very difficult to finely adjust the density of the filter at a local area thereof.

More particularly, since the illumination intensity distribution desired on the fluorescent screen is not always symmetrical, the density distribution of the illumination intensity correcting filter would also be asymmetrical if it were made to correspond to the desired illumination intensity distribution, so that if such correction filter were to be prepared by the conventional vacuum deposition technique or photographic process, the number of the process steps would be greatly increased. Yet a satisfactory filter having the desired density distribution cannot be obtained in spite of a large increase in the number of the process steps. Accordingly, fine adjustment of the density of the filter at a particular local area thereof is almost impossible and hence the illumination intensity correction of the exposure light on the fluorescent screen by means of an illumination intensity correcting filter has been deemed to be almost impossible.

Recently, colour picture tubes of the so-called black matrix type wherein the areas of the fluorescent screen except the portion of the phosphor dots or stripes are coated with graphite have been offered. In the tubes of this type it is of utmost importance to make the dimension of the phosphor dots or stripes as uniform as possible for the purpose of decreasing non-uniform white because the phosphor dots or stripes as a whole contribute to luminescence. It is necessary to correct the exposure light quantity distribution in order to maintain the dimension of the phosphor dots or stripes at a definite value. For this reason, it is necessary to more accurately control the density distribution of the filter than the prior art practice.

SUMMARY OF THE INVENTION

Accordingly, it is an object of this invention to provide light exposure apparatus provided with an improved illumination intensity correcting filter capable of forming phosphor dots or stripes of a colour picture tube to have correct configuration and dimension.

Another object of this invention is to provide a light exposure apparatus including an illumination intensity correcting filter having a desired transmission light quantity distribution and in which the quantity of the light transmitted is different at different portions of the filter.

Still another object of this invention is to provide an improved light exposure apparatus provided with a new and improved correction filter driving device capable of increasing the efficiency of brightness correction of the correction filter.

According to the invention, these and other objects can be accomplished by providing light exposure apparatus of the type wherein a light source, an illumination intensity correcting filter, means for swinging the illumination intensity correcting filter and a correction lens are disposed in a casing, and a face plate provided with a colour selection electrode of a colour picture tube is removably mounted on a casing to be exposed to the light from the light source through the illumination intensity correcting filter and the correction lens, characterized in that the illumination intensity correcting filter comprises a substrate and a plurality of regions having different light transmission characteristics are arranged on the substrate and that the regions are distributed in accordance with a predetermined brightness of the exposure light such that the optical characteristics caused by the mutual action of the regions and the optical characteristics at the boundaries between the regions are substantially averaged by the swinging motion of the illumination intensity correction filter imparted thereto by the swinging means thereby eliminating the effect of the optical characteristics.

The regions may take the form of squares, triangles or polygons which are arranged in a regular pattern such as a grid. Alternatively, such regions may be formed by arranging a plurality of dots on the substrate in equal pitch with different sized dots or in different pitch with equal sized dots. These dots can take not only a circular form but also other pertinent form such as a letter and a figure. The dots comprise a transparent or opaque substance coated with a thin film of metal, aluminum for example.

BRIEF DESCRIPTION OF THE DRAWINGS

Further objects and advantages of the invention will be more fully understood from the following detailed description taken in connection with the accompanying drawings in which.

DESCRIPTION OF THE PREFERRED EMBODIMENT

Figure 1A:
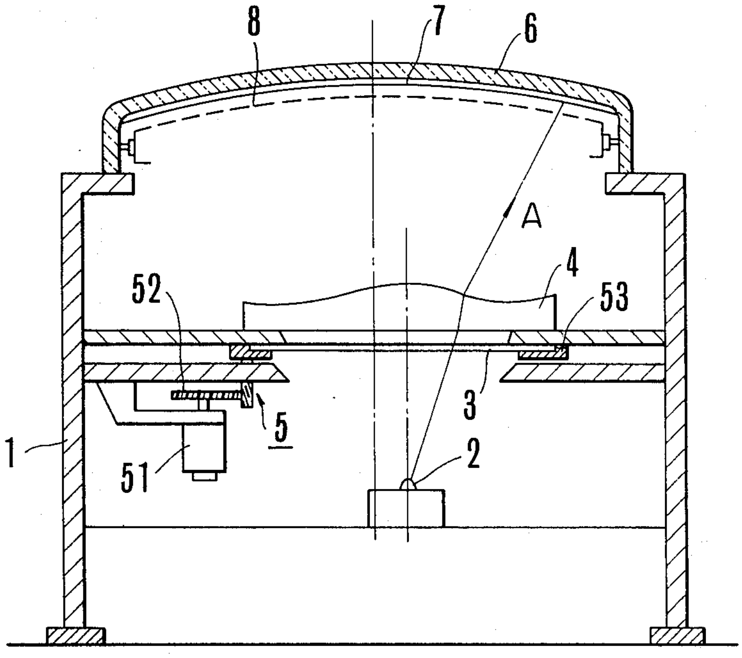
FIG. 1*a* is a longitudinal sectional view of one embodiment of the novel light exposure apparatus of this invention.
Figure 1B:
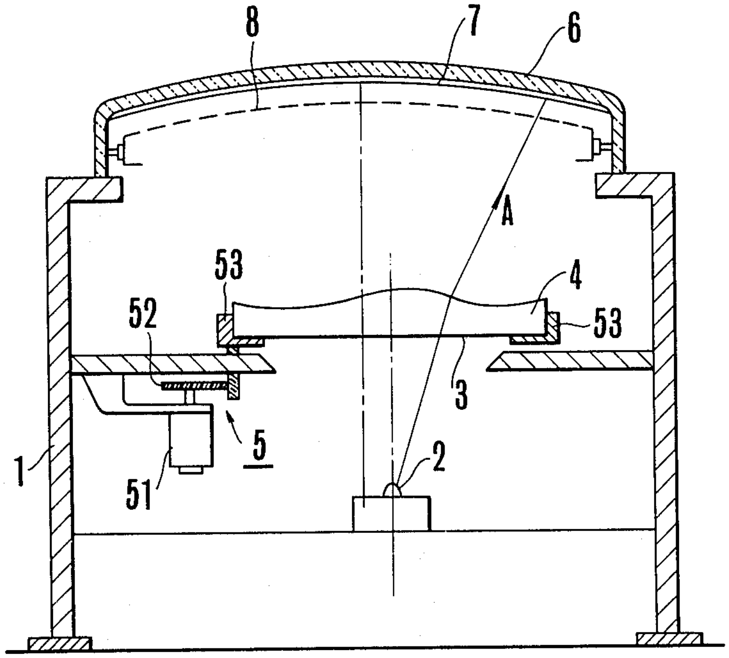
FIG. 1*b* is a longitudinal sectional view of another light exposure apparatus embodying this invention.

A preferred embodiment of the light exposure apparatus illustrated in FIG. 1*a* comprises a main casing 1, a light source 2 disposed at the predetermined bottom portion of the casing 1, an illumination intensity correcting filter 3 disposed in the middle portion of the casing 1 at a predetermined distance from the light source 2, and a swinging device 5 connected to the illumination intensity correcting filter 3 for swinging the same. A correction lens 4 is disposed near the illumination intensity correcting filter 3 so as to cause the light from the light source 2 to travel along a path approximating the locus of the electron beam in the colour picture tube when it is actually used. The relation of position between the illumination intensity correcting filter and the correction lens will be determined according to the initial design requirement of the light exposure apparatus. Then the exposure light travels along a predetermined light path A to reach the fluorescent screen 7 coated on the inner surface of the face plate 6 through a colour selection electrode 8 thereby performing the desired light exposure. As shown in FIG. 1*b*, where the like parts are designated with the like reference numerals used in FIG. 1*a*, another light exposure apparatus by this invention is available wherein the illumination intensity correcting filter is integrally formed together with the correction lens, thereby the number of the apparatus components being decreased, thus resulting in the decrease of manufacturing steps and simplifying the apparatus and the operation thereof.

Figure 2:
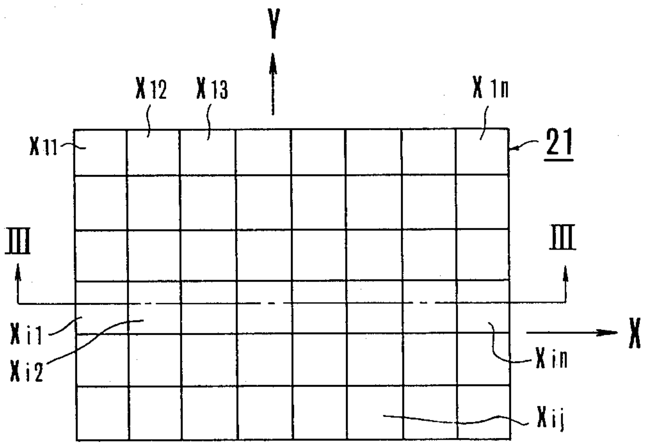
FIG. 2 is a front view of one example of the illumination intensity correction filter embodying the invention.
Figure 3:
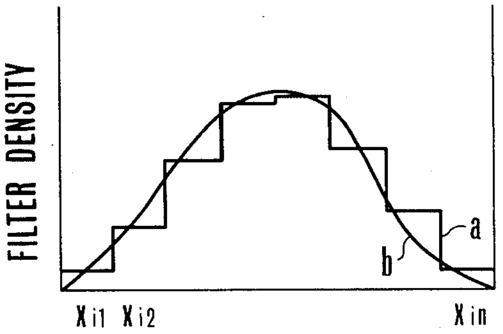
FIG. 3 is plot showing one example of the filter concentration distribution of the illumination intensity correction filter shown in FIG. 2.

FIG. 2 shows a front view of one example of a illumination intensity correction filter utilized in the light exposure apparatus of this invention, as shown, the effective surface of the illumination intensity correcting filter 21 is constituted by a combination of a plurality of filter elements having the desired light transmitting ability made of small glass pieces, for example, arranged in a grid shape. In other words, the effective surface of the illumination intensity correcting filter 21 is divided into a plurality of small square elemental regions $x_{ij}$, which are arranged in a grid. Respective filter elemental regions $x_{ij}$ ($i,j = 1,2,3...n$) are manufactured and arranged to have predetermined light transmitting ability depending upon their positions on the effective surface of the filter. Accordingly the density distribution of the elemental regions $x_{i1}$, $x_{i2}$,....$x_{in}$ of the illumination intensity correcting filter 21 shown in FIG. 3 taken along a line III — III is presented by a characteristics curve *a* in FIG. 3. In other words, it is necessary to provide for the filter 21 an ideal density distribution characteristic *b* as shown in FIG. 3 along the section line III — III, the filter elemental regions $x_{i1}$, $x_{i2}$...$x_{in}$ respectively having light transmission characteristics commensurate with the density at respective points should be arranged along the section line III— III The smaller the individual filter elemental region is, the more the density distribution of the filter 21 becomes accurate.

Figure 4:
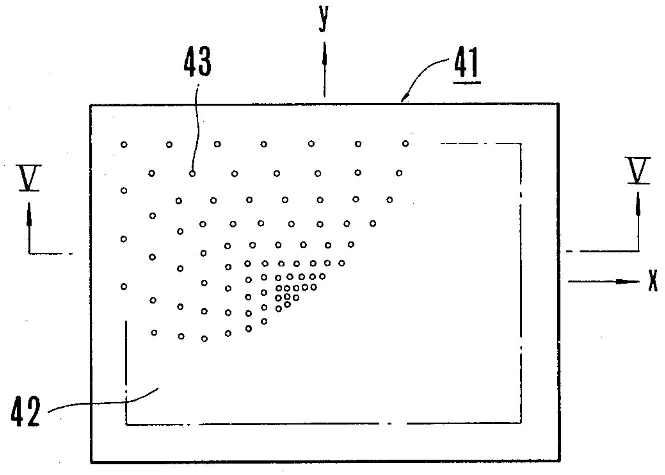
FIG. 4 is a front view of a modified illumination intensity correction filter embodying the invention.

FIG. 4 shows a front view of a modified illumination intensity correcting filter utilized in the light exposure apparatus of this invention. The illumination intensity correcting filter 41, shown therein comprises a transparent substrate such as glass and the effective surface 42 of the substrate provided with a plurality of opaque dots.

Figure 5:
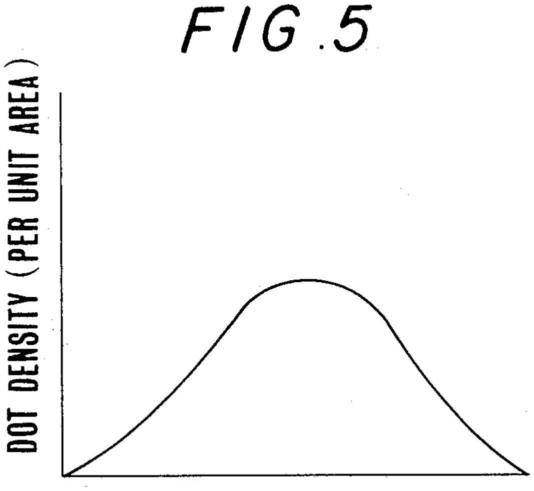
FIG. 5 shows one example of the concentration of the dots of the correction filter shown in FIG. 4.

The construction of the remaining portions of the light exposure apparatus using this modified filter is the same as that shown in FIG. 2. The opaque dots 43 are prepared by vapour depositing opaque material, for example aluminum, on the surface of the substrate, and the density of the opaque dots on the filter 41 is determined by experiments or analytical calculations such that the mean rate of light transmission per unit area adjacent to the dots is equal to the desired value. Instead of varying the density of the dots having the identical diameter it is also possible to arrange at the same pitch dots of different configurations and dimensions. An example of dots distribution taken along the line V — V of FIG. 4 is shown in FIG. 5 in which the same dots are arranged at different pitches.

The configuration of the opaque dots 43 may be circular, triangular, square, polygonal, linear or letters or superimposed letters.

In this manner, according to this invention, an appropriate exposure can be made by using light exposure apparatus utilizing an illumination intensity correcting filter having a desired illumination intensity distribution. Although in the first and second embodiments it is possible to obtain illumination intensity correcting filters having higher accuracies by increasing the number of small elemental regions or dots, increase of these numbers results in the increase in the manufacturing steps as well as labour and time. Consequently, in the first embodiment it is advantageous to divide the effective area of the filter into several hundred elemental regions each about less than 2 mm square. Also in the second embodiment it is advantageous from the practical standpoint to make the pitch of the dots to be about less than 2 mm. With these dimensions, it is possible to eliminate grid shaped stripes due to the joints between adjacent regions or to the arrangement of the dots. Heretofore, the discussion has been made regarding the illumination intensity correcting filter formed with a plurality of preferably sized filter regions or provided with a plurality of desirably sized and pitched dots arranged on the effective surface thereof. However, it will be seen in the following description that this invention can present a more advantageous and effective light exposure apparatus with the illumination intensity correction filter. Although the preferable size of the filter segment or the desirable pitch of dots has been discussed from the practical standpoint so far, this invention is not limited to said filter elemental region size or said dots pitch. That is to say, another elemental region size or dots pitch can be applicable in this invention when the filter is used together with an improved light exposure apparatus provided with a swinging mechanism. Of course, it is clearly noted that more excellent light exposure can be carried out when the aforesaid filters having said practically sized regions or pitched dots, i.e. less than 2 mm square sized segments or 2 mm pitched dots are used together with this improved light exposure apparatus.

In accordance with this invention, a suitable swinging motion is imparted to the illumination intensity correcting filter to eliminate the undesirable boundary effect, for example, the stripes just mentioned. Thus, the filter 21 or 41 is swung in the pertinent direction, for example in $x$-direction or in $y$-direction or in the both direction of $x$ and $y$ axes for the purpose of eliminating said grid shaped stripe and of averaging the optical effect caused by the joints of the regions or by the arrangement of the dots.

For this swinging motion any known device can be applied. Although in FIG. 1 swinging device comprising a supporting member 53 for the correction filter, a cam mechanism 52 connected to said supporting member 53 and a driving means 51, for example, a motor for driving the correcting filter in the proper direction through said cam is adapted to generate a swinging motion, it should be understood that any other devices capable of presenting swinging motion, oscillating motion or vibrating motion to the correcting filter can be used in this invention. To improve the effect of such swinging motion, in the aforementioned embodiments, it is desirable to make the amplitude of the swinging motion (peak to peak) to be equivalent to length of one side of the regions or to the pitch of dots (in the equal pitch arrangement) and that swinging motion should have a uniform speed so as to create linear displacement rate. It is also possible to average the effect caused by the different optical characteristics of respective regions of the correcting filter by means of changing the periods of the swinging motions in the $x$ and $y$ directions.

In the above, although the swinging motion in the direction of the $x$ axis or $y$ axis or its combination is only discussed, it should be noted that the swinging motion in the radial direction or angular direction is also effective to eliminate the grid shaped stripes. Further it should be noted that the amplitude of the swinging motion is not always required to be equivalent length of one side of the elemential region or the pitch of dots, and that oscillation or vibration having a very tiny amplitude is useful for this purpose. In short, proper swinging motion, vibrating motion or oscillating motion can be effectively used in accordance with the mode of dots or elemential region arrangement on the illumination intensity correcting filter.

Although this method is relatively simple because it is only necessary to impart a swinging motion to said correcting filter, it is extremely effective to decrease the adverse effect mentioned above to be negligible.

Instead of using square shaped regions it is also possible to use triangular or hexagonal or the like.

The dimension of the regions may be uniform or varied in accordance with the area having an equal light restricting characteristics.

Further it will be clear that instead of arranging opaque dots on the substrate it is also possible to use transparent dots as far as the light transmitting ability can be made different at the inside and outside of the dots.

From the foregoing description it will be clear that the invention provides light exposure apparatus provided with an illumination intensity correcting filter having a desired density distribution and can form a fluorescent screen of high quality.

What is claimed is:

1. In a light exposure apparatus of the class having a light source, an illumination intensity correcting filter, an exposing light path correction lens, a face plate provided with a colour selection electrode of a colour picture tube, and a casing wherein said light source, said illumination intensity correcting filter and said exposing light path correction lens are disposed in said casing by taking a predetermined position, and said face plate is removably disposed on the top portion of said casing so as to be exposed to light from said light source said illumination intensity correcting filter and said exposing light path correction lens, the improvement wherein said illumination intensity correcting filter is formed as an assembly of individual elements, said elements being sufficient in number to obtain the number of desired elemental changes in light transmissivity required for exposing the area of said screen, each of said elements operable to provide a region restricting light transmission therethrough corresponding to the exposure light quantity which is required to expose the corresponding part of a fluorescent screen coated on the inner surface of said face plate, each said element being formed discretely, each of said regions having a predetermined particular value of light transmissivity distributed in accordance with the desired elemental area distribution of said exposure light quantity.

2. The light exposure apparatus according to claim 1 wherein said individual elements are contiguous on the effective surface of said illumination intensity filter, each having a predetermined value of light transmissivity.

3. The light exposure apparatus according to claim 1 wherein said assembly is formed with a plurality of elements disposed on the effective surface of said illuminating intensity filter.

4. The light exposure apparatus according to claim 1 wherein said assembly of individual elements is integrally formed on said correction lens.

5. The light exposure apparatus according to claim 1 and including means for swinging said illumination intensity correcting filter during light exposure operation.

6. The light exposure apparatus according to claim 2 wherein said elements have uniform dimensions.

7. The light exposure apparatus according to claim 1 wherein the dimensions of each of said elements is varied to provide for its associated region the particular value of light transmissivity.

8. The light exposure apparatus according to claim 3 wherein said elements are formed in such manner that the light transmitting ability within said element is different from that of the area surrounding said element.

9. The light exposure apparatus according to claim 8 wherein said elements are formed with an opaque substance.

* * * * *